United States Patent [19]
Lemelson

[11] 3,842,432
[45] Oct. 15, 1974

[54] MAGNETIC TAPE TRANSDUCING SYSTEM

[76] Inventor: Jerome H. Lemelson, 85 Rector St., Metuchen, N.J. 08840

[22] Filed: Mar. 11, 1974

[21] Appl. No.: 449,602

Related U.S. Application Data

[60] Continuation-in-part of Ser. No. 295,807, Oct. 10, 1972, which is a continuation of Ser. No. 224,131, Feb. 7, 1972, Pat. No. 3,699,266, which is a continuation-in-part of Ser. No. 142,748, Aug. 28, 1961, Pat. No. 3,646,258, which is a division of Ser. No. 515,417, June 14, 1955, Pat. No. 3,003,109.

[52] U.S. Cl. .................................... 360/105, 360/93
[51] Int. Cl. ......................... G11b 5/54, G11b 19/20
[58] Field of Search ......................... 360/92, 93, 105

[56] References Cited

UNITED STATES PATENTS

| | | | |
|---|---|---|---|
| 2,637,560 | 5/1953 | Smith | 360/105 |
| 2,650,830 | 9/1953 | Potter | 360/105 |
| 2,857,164 | 10/1958 | Camras | 360/93 |

*Primary Examiner*—Howard W. Britton

[57] ABSTRACT

A magnetic tape transducing system is provided having a simple mechanism for simultaneously magnetically coupling to and driving a magnetic record tape. In one form, a magnetic transducer and drive wheel are simultaneously urged into operative relationship with a magnetic tape by the lineal movement thereof wherein the tape is simultaneously engaged by a transducer and pinched between drive and depressor rolls. In another form, the tape is driven within a housing between a supply reel and a take-up reel and a common mount for a transducer and a tape drive wheel of cylinder is lineally actuated to engage the tape which is driven past an opening in the wall of the housing.

4 Claims, 2 Drawing Figures

MAGNETIC TAPE TRANSDUCING SYSTEM

RELATED APPLICATIONS

Figure 2:
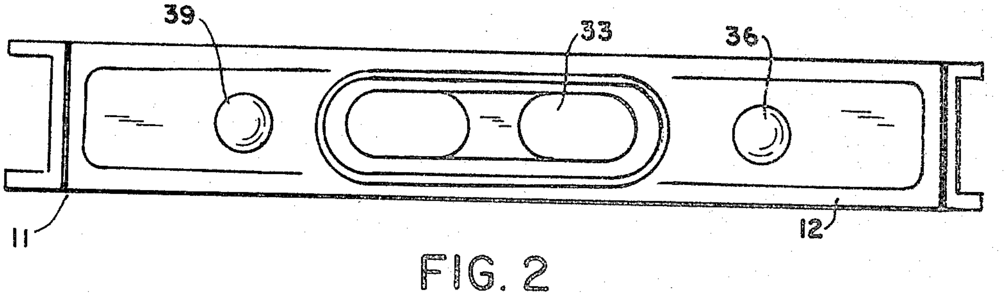

This is a continuation-in-part of application Ser. No. 295,807, filed Oct. 10, 1972, for Scanning System, which was a continuation of application Ser. No. 224,131, filed Feb. 7, 1972, now U.S. Pat. No. 3,699,266, filed as a continuation-in-part of Ser. No. 142,748 which was filed Aug. 28, 1961, now U.S. Pat. No. 3,646,258, as a division of Ser. No. 515,417, filed June 14, 1955, which issued as U.S. Pat. No. 3,003,109.

SUMMARY OF THE INVENTION

This invention relates to a magnetic tape drive and transducing apparatus employing a mechanism which includes a common mount for one or more magnetic transducers and a cylindrical member such as a drive wheel which is rotatably supported on the common mount and is urged with the movement of the common mount to engage the tape simultaneously as the transducer engages the tape.

Prior to the making of the instant invention, it was known in the art to provide mechanisms which involved separate operations for magnetically coupling to a magnetic tape for transducing purposes and mechanically engaging the tape to drive same past a transducer. Such mechanisms were relatively complex in their operation or failed to provide suitable operation of the tape drive and transducing means. Furthermore, by providing separate tape transducing and drive means, the mechanism was not only complex in structure and operation but frequently resulted in failure to properly effect a recording while the tape was in motion.

Accordingly, it is a primary object of this invention to provide a new and improved magnetic tape drive and transducing apparatus.

Another object is to provide a magnetic tape transducing apparatus employing a tape supported within and guided by a mechanism including a housing or cartridge and a separate drive and transducing means for the tape of the cartridge.

Another object is to provide a magnetic tape transducing and drive arrangement whereby a transducer and tape drive means are respectively supported at different locations on the common mount which mount is lineally movable a short distance towards and away from the tape to thereby bring the transducer and the drive from a retracted position to a tape engaging position during a single lineal actuation thereof.

Another object is to provide a tape cartridge transducing arrangement wherein the tape in the cartridge is easily engageable by a drive wheel and a transducer which are movable simultaneously into and out of engagement with the tape of the cartridge.

With the above and such other objects in view as may hereafter more fully appear, the invention consists of the novel constructions, combinations and arrangements of parts as will be more fully described and illustrated in the accompanying drawings, but it is to be understood that changes, variations and modifications may be resorted to which fall within the scope of the invention as claimed.

Figure 1:
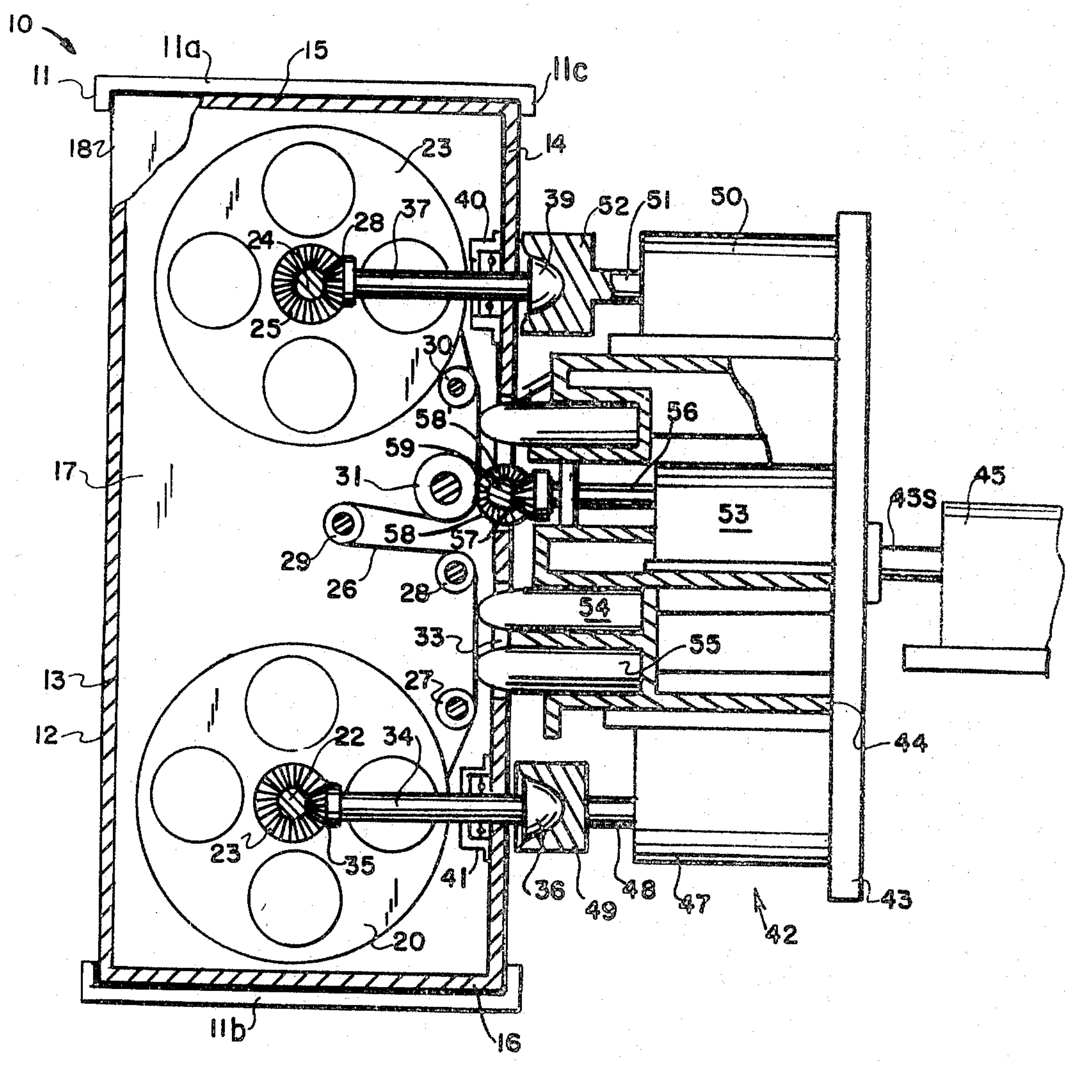

In the drawings:

FIG. 1 is a side view with parts broken away for clarity of a magnetic tape magazine and a combined transducing and drive means for the tape in the magazine, and FIG. 2 is an end view of the magazine of FIG. 1.

There is shown in FIGS. 1 and 2 a magnetic recording and reproduction apparatus 10 comprising a support 11 such as a housing or rack for prepositioning and holding a magazine 12 containing magnetic tape 26 supported and guided therein to travel between a supply reel 20 and a take-up reel 23 both of which are supported for rotation on shafts 22 and 24 by the sidewalls 17 and 18 of the magazine. The support 11 is shown having a plurality of guides **11*a* and 11*b* for predeterminately locating the upper and lower walls of the magazine 12 and a guide or stop 11*c* for longitudinally locating the magazine with respect to a transducing and driving assembly to be described. The magazine 12 is composed of end walls 13, 14, top and bottom walls 15, 16 and said sidewalls 17, and 18 and is substantially rectangular parallelepiped in shape. Magnetic tape 26 is guided by a plurality of cylindrical members or wheels 27 to 31 which are rotationally supported by the sidewalls of the magazine housing in a path parallel and adjacent an opening 33 in the end wall 14.**

Upon prepositioning or securing the magazine 12 on the support 11, a transducing and tape driving assembly 42 is operated to bring one or more transducers into operative engagement with the tape and driving means to engage the tape and reel driving means. Shown extending through openings in end-wall 14 and rotatably supported by bearings 40, 41 supported by said endwall and bearings not shown supported by the sidewall 18 are respective shafts 34 and 37 containing bevel gears 35 and 38 which engage and mesh with bevel gears 23 and 25 supported by the shafts 21 and 24 which support reels 20 and 23. The latter shafts are rotatably supported by the sidewalls of the magazine 12. Secured to the other ends of shafts 34 and 37 are respective conical coupling members 36 and 39 which serve as means for coupling respective drive means to the shafts.

The tape drive and transducing assembly 42 is composed of a mount 43 which contains a plurality of magnetic heads or transducers 54 and 55 and rotationally supports a cylindrical drive wheel 58 for the tape preferably in alignment with each other and movable together on the common mount 43 so as to simultaneously engage the tape located adjacent the opening 33 in end wall 14. Also shown supported by support or mount 43 are respective motor operated drive units 47 and 50 which contain respective coupling devices 49 and 52 supported at the ends of their drive shafts 48 and 51 and located to engage the shaped coupling members 36 and 39 at the ends of shafts 34 and 37 when the assembly 42 is operatively located, as shown, with respect to the magazine 12. Drive unit 50 is operable to drive the take-up reel 23 to take up tape as it is fed by the driving action of drive wheel 58 engaging the tape against wheel 31. The drive unit or motor 50 preferably contains a slip clutch or tension responsive means to draw the tape onto reel 23 without driving it from between wheels 31 and 58 or overstretching same.

A third reversible motor 53 is a constant speed motor which is also supported by mount 43 and has a bevel gear 57 secured to the end of its output shaft 56 which gear engages the teeth of a second bevel gear 58′ secured to a shaft 59 which is supported in bearing by the housing 44 enclosing the assembly 42. Shaft 59 supports the tape drive wheel or capstan wheel 58 which is driven in rotation by motor 53 and is located in mount 43 so as to engage the tape 26 against a wheel 31 which is supported in rotation by the sidewall of the magazine behind the tape and serves as a depressor wheel permitting the capstan wheel to drive the tape in either direction past the heads. When the tape 26 is driven from reel 20 to reel 23, constant speed motor 53 is operable to rotate wheel 58 clockwise and the motor of unit 50 is energized to drive reel 23 to wind the tape thereon while reel 20 is permitted to freely play out tape by deactivating drive 47. To drive the tape 26 onto reel 20, motor 47 is operated while motor 50 is retained inoperable with its output shaft 51 free to turn so that reel 23 may play out tape to reel 20.

Also shown in FIG. 1 is an actuator 45 for the mount 43 containing the magnetic heads and the drive motors. The actuator may comprise a bistable solenoid or motor driven mechanism shown with its output 45S directly connected to the mount 43. When shaft 45S is projected as shown and a magazine is in the operative location illustrated, the magnetic heads 54, 55 are urged into engagment with the tape 26 in the magazine, while the drive wheel 58 is positioned against the tape compressing it against wheel 31 and the coupling devices 49 and 52 of motors 47 and 48 are engaged with coupling members 36 and 39 of the magazine.

In one mode of operation, drive units 50 and 53 are simultaneously operated to cause the tape to be driven at substantially constant speed past the transducers onto take-up reel 23. In another operative mode, the motor 53 is reversed and the motor of drive unit 47 is energized to drive the tape back onto reel 20 at the end of a transducing operation.

It is also noted that the mount 43 for the tape drive and transducing assembly 42 may be pivotally supported on a housing or base such as support 11 and actuated by a solenoid, motor or other means to pivotally engage the illustrated coupling devices into and out of operative relations with the corresponding driven members of the magazine 12 as well as the illustrated transducers into and out of operative relationship with tape 26 as shown.

I claim:

1. A magnetic transducing apparatus comprising in combination:

a magazine containing magnetic tape and including supply and take-up means for a length of elongated magnetic tape, said magazine having sidewalls and end walls surrounding said tape, an opening in an end wall of said magazine, means for guiding a portion of said tape in a fixed path past said end wall opening, a first cylindrical member rotatably supported behind said portion of said tape which is guided in said fixed path, a second cylindrical member, a magnetic transducer, a common support for supporting said second cylindrical member and said magnetic transducer, a base having means for removably and predeterminately supporting said magazine at a location on said base whereby said second cylindrical member and said magnetic transducer are in direct alignment with said end wall opening in said magazine, means for guiding said common support in movement towards and away from said magazine along a path wherein said transducer may engage said portion of said tape disposed at said end wall opening and may clear said magazine, power operated means for driving said common support from a first location wherein said second cylindrical member is out of operable contact with said tape and is disposed away from said magazine to a second location wherein said second cylindrical member is engaged against and is pinching said tape against said first cylindrical member and said transducer simultaneously engages said tape, means for causing said transducer to move towards and operatively engage said portion of said tape aligned with said opening in said end wall of said magazine, and means for power rotating one of said first and second cylindrical members when said first and said second cylindrical members are engaging and pinching tape therebetween to drive said tape between said supply and said take-up means.

2. A magnetic tape transducing apparatus in accordance with claim 1 wherein said power operated means comprises a bistable lineal actuator operable to move said second cylindrical member between said first and second locations to cause said second cylindrical member to engage said tape against said first cylindrical member when actuated in a first direction and to become disengaged from said tape and clear said magazine when actuated in a second direction.

3. A magnetic transducing apparatus in accordance with claim 2 wherein said lineal actuator comprises a solenoid.

4. A record tape transducing apparatus comprising in combination:

a magazine containing record tape and including supply take-up means for a length of elongated record tape, said magazine having side walls and end walls surrounding said tape, an opening in an end wall of said magazine, means for guiding a portion of said tape in a fixed path past said end wall opening, a first cylindrical member rotatably supported behind said portion of said tape which is guided in said fixed path, a second cylindrical member, a scanning transducer, a common support for supporting said second cylindrical member and said scanning transducer, a base having means for removably supporting said magazine at a location therein whereby said second cylindrical member and said scanning transducer are in direct alignment with said end wall opening in said magazine, means for guiding said common support in movement towards and away from said magazine along a path wherein said scanning transducer may be operably positioned with respect to said portion of said tape disposed at said end wall opening from a distance away from said magazine wherein said transducer is out of operative relation with said tape of said magazine, means for driving said common support from a first location wherein said second cylindrical member is out of operable contact with said tape and is disposed away from said magazine to a second location wherein said second cylindrical member is engaged against said tape and forces said tape against said first cylindrical member, and wherein said scanning transducer moves with said common support towards said magazine and becomes operatively disposed for scanning said portion of said tape aligned with said opening in said end wall of said magazine, and means for power rotating one of said first and second cylindrical members when said first and second cylindrical members are engaging said tape therebetween to drive said tape between said supply and said take-up means.

* * * * *

UNITED STATES PATENT OFFICE
CERTIFICATE OF CORRECTION

Patent No. 3,842,432 Dated October 15, 1974

Inventor(s) Jerome H. Lemelson

It is certified that error appears in the above-identified patent and that said Letters Patent are hereby corrected as shown below:

The term of this patent subsequent to May 12, 1987, has been disclaimed.

Signed and Sealed this

*thirtieth* Day of *September 1975*

[SEAL]

*Attest:*

RUTH C. MASON
*Attesting Officer*

C. MARSHALL DANN
*Commissioner of Patents and Trademarks*

REEXAMINATION CERTIFICATE (1242nd)

United States Patent [19]

Lemelson

[11] B1 3,842,432

[45] Certificate Issued Apr. 10, 1990

[54] MAGNETIC TAPE TRANSDUCING SYSTEM

[76] Inventor: Jerome H. Lemelson, 85 Rector St., Metuchen, N.J. 08840

Reexamination Request:
No. 90/001,607, Sep. 26, 1988

Reexamination Certificate for:

| | |
|---|---|
| Patent No.: | **3,842,432** |
| Issued: | **Oct. 15, 1974** |
| Appl. No.: | **449,602** |
| Filed: | **Mar. 11, 1974** |

Certificate of Correction issued Sep. 30, 1975.

Related U.S. Application Data

[60] Continuation-in-part of Ser. No. 295,807, Oct. 10, 1972, which is a continuation of Ser. No. 224,131, Feb. 7, 1972, Pat. No. 3,699,266, which is a continuation-in-part of Ser. No. 142,748, Aug. 28, 1961, Pat. No. 3,646,258, which is a division of Ser. No. 515,417, Jun. 14, 1955, Pat. No. 3,003,109.

[51] Int. Cl.[4] .......................... G11B 5/54; G11B 19/20

[52] U.S. Cl. .......................................... 360/105; 360/93; 360/96.1

[58] Field of Search ................. 360/92, 93, 96.1, 96.2, 360/105; 362/8, 73, 123; 358/102

[56] References Cited

FOREIGN PATENT DOCUMENTS 712536 7/1954 United Kingdom .

*Primary Examiner*—John H. Wolff

[57] ABSTRACT

A magnetic tape transducing system is provided having a simple mechanism for simultaneously magnetically coupling to and driving a magnetic record tape. In one form, a magnetic transducer and drive wheel are simultaneously urged into operative relationship with a magnetic tape by the lineal movement thereof wherein the tape is simultaneously engaged by a transducer and pinched between drive and depressor rolls. In another form, the tape is driven within a housing between a supply reel and a take-up reel and a common mount for a transducer and a tape drive wheel of cylinder is lineally actuated to engage the tape which is driven past an opening in the wall of the housing.

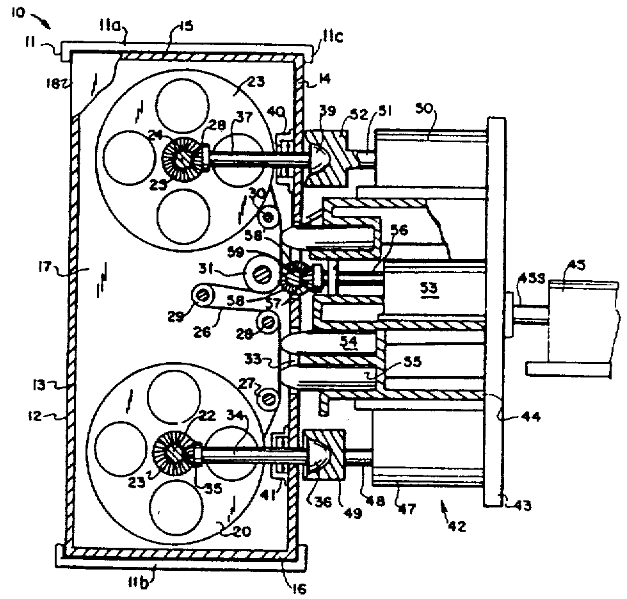

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–4 are cancelled.

* * * * *